(12) United States Patent
Hersey et al.

(10) Patent No.: US 7,497,018 B2
(45) Date of Patent: Mar. 3, 2009

(54) LASER-BASED ALIGNMENT TOOL

(76) Inventors: William Hersey, 17 Bahr La., Corte Madera, CA (US) 94925; William H. Baylis, 4850 Paradise Dr., Tiburon, CA (US) 94920; Yongxin Luo, 2559 47th Ave., San Francisco, CA (US) 94116

( * ) Notice: Subject to any disclaimer, the term of this patent is extended or adjusted under 35 U.S.C. 154(b) by 37 days.

(21) Appl. No.: 11/442,003

(22) Filed: May 26, 2006

(65) Prior Publication Data

US 2007/0271800 A1    Nov. 29, 2007

(51) Int. Cl.
G01C 15/00 (2006.01)
G01B 11/26 (2006.01)

(52) U.S. Cl. .................. 33/286; 33/281; 33/DIG. 21

(58) Field of Classification Search ............... 33/227, 33/228, 281–286, 276, 277, DIG. 21; 356/445, 356/399, 400
See application file for complete search history.

(56) References Cited

U.S. PATENT DOCUMENTS

| | | | |
|---|---|---|---|
| 3,588,249 A | 6/1971 | Studebaker | |
| 3,729,266 A | 4/1973 | Mason et al. | |
| 3,771,876 A | 11/1973 | Ljungdahl et al. | |
| 3,820,903 A | 6/1974 | Kindl et al. | |
| 3,822,943 A | 7/1974 | Mason | |
| 3,854,820 A * | 12/1974 | Hansen | 356/138 |
| 3,856,409 A | 12/1974 | Cindrich et al. | |
| 3,897,637 A | 8/1975 | Genho | |
| 3,936,197 A | 2/1976 | Aldrink et al. | |
| 3,964,824 A | 6/1976 | Dixon | |
| 3,982,839 A * | 9/1976 | Schwartz | 356/250 |
| 4,031,629 A | 6/1977 | Paluck | |
| 4,062,634 A | 12/1977 | Rando et al. | |
| 4,111,564 A * | 9/1978 | Trice, Jr. | 356/247 |
| 4,183,667 A | 1/1980 | Denton | |
| 4,221,483 A | 9/1980 | Rando | |
| 4,333,242 A | 6/1982 | Genho, Sr. | |
| 4,448,528 A | 5/1984 | McManus | |
| 4,468,119 A | 8/1984 | Hamar | |
| 4,471,530 A | 9/1984 | Kirven | |
| 4,566,202 A | 1/1986 | Hamar | |
| 4,679,937 A | 7/1987 | Cain et al. | |
| 4,767,208 A | 8/1988 | Cain et al. | |
| 4,781,457 A | 11/1988 | Hirano et al. | |
| 4,830,489 A | 5/1989 | Cain et al. | |
| 4,836,669 A * | 6/1989 | Teach | 359/857 |
| 4,852,265 A | 8/1989 | Rando et al. | |
| 4,854,703 A | 8/1989 | Ammann | |

(Continued)

OTHER PUBLICATIONS

LaserMark® Gizmo II & III Laser Cross Levels. Datasheet (2 pages) [online] CST Corp. [retrieved on May 28, 2002]. Retrieved on the Internet: <URL:www.cstsurvey.com/catalog/pdf/LMGIZ23_0300.pdf>.

(Continued)

*Primary Examiner*—G. Bradley Bennett
*Assistant Examiner*—Amy Cohen Johnson
(74) *Attorney, Agent, or Firm*—Fish & Richardson P.C.

(57) ABSTRACT

The present invention provides apparatus and a method for projecting an indication of alignment. The invention features forming a first output beam, and a second output beam that is substantially perpendicular to the first output beam. The first output beam indicates level, the second output beam indicates plumb, and the first and second output beams together indicate square.

23 Claims, 14 Drawing Sheets

U.S. PATENT DOCUMENTS

| | | | |
|---|---|---|---|
| 4,912,851 A | 4/1990 | Rando et al. | |
| 4,973,158 A | 11/1990 | Marsh | |
| 4,993,161 A | 2/1991 | Borkovitz | |
| 5,012,585 A | 5/1991 | DiMaggio | |
| 5,144,486 A | 9/1992 | Hart | |
| 5,144,487 A | 9/1992 | Hersey | |
| 5,184,406 A | 2/1993 | Swierski | |
| 5,218,355 A | 6/1993 | Burkhardt | |
| 5,243,398 A | 9/1993 | Nielsen | |
| 5,257,279 A | 10/1993 | Dugan et al. | |
| 5,307,368 A | 4/1994 | Hamar | |
| 5,335,244 A | 8/1994 | Dugan et al. | |
| 5,430,549 A | 7/1995 | Anderson | |
| 5,459,932 A | 10/1995 | Rando et al. | |
| 5,500,524 A * | 3/1996 | Rando | 250/216 |
| 5,539,990 A | 7/1996 | Le | |
| 5,552,886 A | 9/1996 | Kitajima et al. | |
| 5,583,685 A | 12/1996 | Ohtomo et al. | |
| 5,599,050 A | 2/1997 | Tinsley | |
| 5,619,802 A | 4/1997 | Rando et al. | |
| 5,629,921 A | 5/1997 | Eastman et al. | |
| 5,689,330 A | 11/1997 | Gerard et al. | |
| 5,754,287 A | 5/1998 | Clarke | |
| 5,782,003 A | 7/1998 | Bozzo | |
| 5,864,956 A | 2/1999 | Dong | |
| 5,898,809 A | 4/1999 | Taboada et al. | |
| 5,907,907 A | 6/1999 | Ohtomo et al. | |
| 5,933,393 A * | 8/1999 | Kitajima | 368/268 |
| 5,992,029 A | 11/1999 | Dong | |
| 6,035,540 A | 3/2000 | Wu et al. | |
| 6,065,217 A | 5/2000 | Dong | |
| 6,087,645 A | 7/2000 | Kitajima et al. | |
| 6,104,479 A | 8/2000 | Ohtomo et al. | |
| 6,177,978 B1 | 1/2001 | Ting | |
| 6,292,303 B1 | 9/2001 | Hamar | |
| 6,470,578 B1 | 10/2002 | Phuly et al. | |
| 6,539,638 B1 | 5/2003 | King | |
| 6,563,646 B1 | 5/2003 | Litvin | |
| 6,568,094 B2 | 5/2003 | Wu | |
| 6,618,950 B2 * | 9/2003 | Huang et al. | 33/286 |
| 6,625,895 B2 | 9/2003 | Tacklind et al. | |
| 6,710,929 B2 | 3/2004 | Phuly et al. | |
| 6,751,879 B1 | 6/2004 | Pu | |
| 6,763,595 B1 | 7/2004 | Hersey | |
| 6,763,596 B1 | 7/2004 | Puri et al. | |
| 6,782,034 B2 | 8/2004 | Li | |
| 6,892,463 B1 | 5/2005 | Pu | |
| 6,922,901 B1 * | 8/2005 | Chou et al. | 33/290 |
| 6,938,350 B1 * | 9/2005 | Hersey | 33/286 |
| 7,121,010 B2 * | 10/2006 | Marshall et al. | 33/286 |
| 7,134,211 B2 | 11/2006 | Bascom et al. | |
| D537,373 S | 2/2007 | Lin | |
| 7,178,250 B2 * | 2/2007 | Nash et al. | 33/286 |
| D538,688 S | 3/2007 | Snider | |
| D538,691 S | 3/2007 | Munroe et al. | |
| 7,204,027 B2 | 4/2007 | Tacklind | |
| 2003/0051355 A1 | 3/2003 | Phuly et al. | |
| 2003/0101605 A1 | 6/2003 | Tacklind et al. | |
| 2003/0101606 A1 | 6/2003 | Li | |
| 2004/0012962 A1 | 1/2004 | Wolf | |
| 2005/0091859 A1 | 5/2005 | Pu | |
| 2005/0155239 A1 * | 7/2005 | Chen et al. | 33/290 |

OTHER PUBLICATIONS

Compact Laser System with Beam Splitting Prism. Datasheet (2 pages) [online] Stabila [retrieved May 28, 2002]. Retrieved on the Internet: <URL:www.stabila.com/ProductDetails.asp?C=10&P=35>.

Laserjamb Q2. Datasheet (3 pages) [online] Laserjamb [retrieved May 29, 2002]. Retrieved on the Internet: <URL:www.laserjamb.com/q2.html>.

Laser Genius™ 3210. Datasheet (2 pages) [online] Quarton Inc., 2000 [retrieved May 29, 2002]. Retrieved on the Internet: <URL:www.quarton.com.tw/3210.htm>.

International Search Report and Written Opinion of the International Searching Authority, PCT Application Serial No. PCT/US2007/069779, Jan. 18, 2008, 14 pp.

* cited by examiner

LASER-BASED ALIGNMENT TOOL

TECHNICAL FIELD

This invention relates to a laser-based tool for indicating level, plumb and/or square.

BACKGROUND

Portable devices capable of indicating level, plumb and square alignment have been useful in the construction and carpentry trades for some time. The advent of laser technology has seen the use of portable laser emitting devices capable indicating level and plumb, as well as level, plumb and square alignments simultaneously.

In some prior art tools, alignment is indicated with beams that form points of light or "spots" on a surface against which they are projected. In some prior art tools, an invisible "line" can be imagined between two or more opposing and aligned spots to provide an alignment line. Other tools indicate alignment with beams that form the image of a straight line on the surface against which they are projected, that is, they project linear alignment beams.

Such devices typically require some sort of tilt-compensation mechanism or self-leveling mechanism, to avoid the introduction of error when operated from a non-level surface. However, even with a tilt-compensation or self-leveling mechanism, such tools typically can only accurately indicate level and plumb within a range of inclinations of the tool relative to level. To avoid a user inadvertently relying on an erroneous indication of alignment, some tools provide an indication to the user, when the user is attempting to use the tool outside of a predefined range of inclinations, for example, by ceasing projection of alignment beams or causing the alignment beams to blink.

SUMMARY

The present invention provides apparatus and a method projecting alignment lines. In general, in one aspect, the invention features an apparatus for projecting an indication of alignment. The apparatus includes a housing, a projection unit and a damper to dampen pendular motion of the projection unit. The projection unit is pendulously suspended in the housing to project output beams to indicate level, plumb and square and includes a vertical projection module and a horizontal projection module. Each of the vertical and horizontal projection modules include (1) a laser emitting diode to emit a laser beam incident on a collimator, (2) a collimator configured to collimate the laser beam into a collimated beam and project the collimated beam on a planar reflective surface; (3) a planar reflective surface orientated at an angle of approximately 45° to a path of the collimated beam projected from the collimator and configured to divert the path of the collimated beam approximately 90° and toward a partial-conical reflective surface; and (4) a partial-conical reflective surface formed from approximately 180° of an exterior surface of a cone and configured to reflect the diverted collimated beam into an approximately 180° fanned output beam. The vertical projection module generates a substantially vertical output beam and the horizontal projection module generates a substantially horizontal output beam, the vertical and horizontal output beams being projected from the housing in different but generally perpendicularly related directions. The output beams can be used to indicate level, plumb and square alignment.

Implementations of the invention may include one or more of the following features. The vertical projection module and the horizontal projection module can be positioned within the apparatus such that the vertical output beam and the horizontal output beam both emanate from a same face of the apparatus. Each collimator can be an aspheric lens and each collimated beam can have an elliptically shaped cross-section. The apparatus may further include at least one battery to provide power to the laser emitting diodes of the projection unit.

The apparatus may include an error indicator to indicate when the housing is inclined such that the accuracy of the level and plumb directions are compromised; and an override to deactivate the error indicator, whereby the output beams can be used at least to indicate square alignment. The error indicator can suspend projection of the vertical and horizontal output beams. The error indicator can indicate the housing is inclined such that the accuracy of the level and plumb directions is compromised, when the housing is inclined in any direction in the range of approximately plus or minus 4 to 9 degrees from horizontal. In another implementation, the error indicator indicates the housing is inclined such that the accuracy of the level and plumb directions is compromised, when the housing is inclined in any direction more than approximately 9 degrees from horizontal. The override can include digital circuitry to deactivate the error indicator in response to a user input.

The damper can include a magnet mounted in the housing below the projection unit and a damping plate rigidly suspended from the projection unit, such that the damping plate is positioned above the magnet with a gap maintained therebetween sufficiently small that eddy currents are generated in the damping plate by motion thereof above the magnet.

The apparatus can further include a user interface configured to receive a user input, wherein: in response to a first user input, the projection unit projects a horizontal output beam that can be used to indicate level; in response to a second user input, the projection unit projects a vertical output beam having a generally perpendicular relationship to the horizontal output beam, whereby the vertical output beam can be used indicate plumb; in response to a third user input, the projection unit projects simultaneously the horizontal and vertical output beams, whereby the output beams can be used to indicate simultaneously level, plumb and square; and in response to a fourth user input, the override is employed to deactivate the error indicator, and the projection unit simultaneously projects the horizontal and vertical output beams, whereby the output beams can be used to at least indicate square.

The vertical projection module can be mounted relative the housing at an angle γ relative to a vertical axis of the housing such that the approximately 180° fanned output beam from the vertical projection module is rotated approximately the angle γ from a vertical orientation. In one implementation, the angle γ is approximately 15°. In another implementation, the laser emitting diode included in the vertical projection module is orientated such that the laser beam emitting therefrom has a substantially elliptical cross-section with a long axis of the ellipse orientated at an angle γ relative to a vertical orientation, such that the approximately 180° fanned output beam is rotated approximately the angle γ from a vertical orientation.

In general, in another aspect, the invention features a method for projecting an indication of alignment. The method includes projecting a first laser beam and a second laser beam and collimating the first laser beam into a first collimated beam and collimating the second laser beam into a second collimated beam. The first collimated beam is incident on a first planar reflective surface and diverted approximately 90° toward an approximately 180° first partial-conical reflective surface, and reflected to form a first output beam fanning approximately 180° in a first direction. The second collimated beam is incident on a second planar reflective surface and diverted approximately 90° toward an approximately 180° second partial-conical reflective surface, and reflected to form a second output beam fanning approximately 180° in a second direction. The first output beam indicates level, the second output beam indicates plumb, and the first and second output beams together indicate square.

Implementations of the invention may include one or more of the following features. The method can further include providing an error indicator to indicate an error in the accuracy of the first and second output beams as indicators of level and plumb respectively; and deactivating the error indicator, such that the first and second output beams can be used at least to indicate square. The output beams can be projected in the image of substantially straight lines.

In general in another aspect the invention features an apparatus for projecting an indication of alignment, the apparatus including a housing, a projection unit and a damper to dampen pendular motion of the projection unit. The projection unit is pendulously suspended in the housing to project at least one output beam. The projection unit includes at least one projection module that includes: (1) a laser emitting diode to emit a laser beam incident on a collimator, (2) a collimator configured to collimate the laser beam into a collimated beam and project the collimated beam on a planar reflective surface; (3) a planar reflective surface orientated at an angle of approximately 45° to a path of the collimated beam projected from the collimator and configured to divert the path of the collimated beam approximately 90° and toward a partial-conical reflective surface; and (4) a partial-conical reflective surface formed from approximately 180° of an exterior surface of a cone and configured to reflect the diverted collimated beam into an approximately 180° fanned output beam.

Implementations of the apparatus may include one or more of the following features. The laser emitting diode can emit a laser beam having a substantially elliptical cross-section. The collimator can be an aspheric lens.

In general, in another aspect, the invention features a laser projection module. The laser projection module includes a laser emitting diode, a collimator, a planar reflective surface and a partial-conical reflective surface. The laser emitting diode emits a laser beam incident on the collimator. The collimator is configured to collimate the laser beam into a collimated beam and project the collimated beam on the planar reflective surface. The planar reflective surface is orientated at an angle of approximately 45° to a path of the collimated beam projected from the collimator and configured to divert the path of the collimated beam approximately 90° and toward the partial-conical reflective surface. The partial-conical reflective surface is formed from approximately 180° of an exterior surface of a cone and configured to reflect the diverted collimated beam into an approximately 180° fanned output beam.

Implementations of the invention may include one or more of the following features. The laser emitting diode can emit a laser beam having a substantially elliptical cross-section. The collimator can be an aspheric lens. The planar reflective surface can be a plane mirror.

The invention can be implemented to realize one or more of the following advantages. The use of a planar reflective surface to divert the laser beam path in conjunction with a conical reflective surface allows the tool to provide the desired functionality while requiring a relatively small footprint. The tool can be implemented in a compact and lightweight configuration, which a user can operate with one hand, leaving a free hand to make alignment marks and facilitating use in confined spaces, e.g., window and door openings. Additionally, the tool provides approximately 180° fanned output beams provided longer projected alignment images (i.e., vertical and horizontal lines projected onto a wall for example).

Prior art laser alignment tools typically required precise adjustments between the diode and the optics within a module during manufacturing and post-assembly. Although assembling the laser alignment tool described herein will require some adjustments, e.g., to set the vertical and horizontal projection modules perpendicular to each other as well as level and plumb, the need for the somewhat tedious adjustments required for some prior art tools is alleviated. The laser alignment tool includes an error indicator permitting a user to operate the tool to accurately indicate level, plumb and square alignment, knowing the tool will be disabled, or the user will be otherwise notified, if the tool is positioned such that indications of level and plumb alignments may be inaccurate. A user has the option of deactivating the error indicator, to permit use of the tool to indicate square alignment when the tool is in virtually any position, including positions that would not accurately indicate level and plumb.

The details of one or more embodiments of the invention are set forth in the accompanying drawings and the description below. Other features and advantages of the invention will be apparent from the description, the drawings, and the claims.

DESCRIPTION OF DRAWINGS

Like reference symbols in the various drawings indicate like elements.

DETAILED DESCRIPTION

Figure 1:
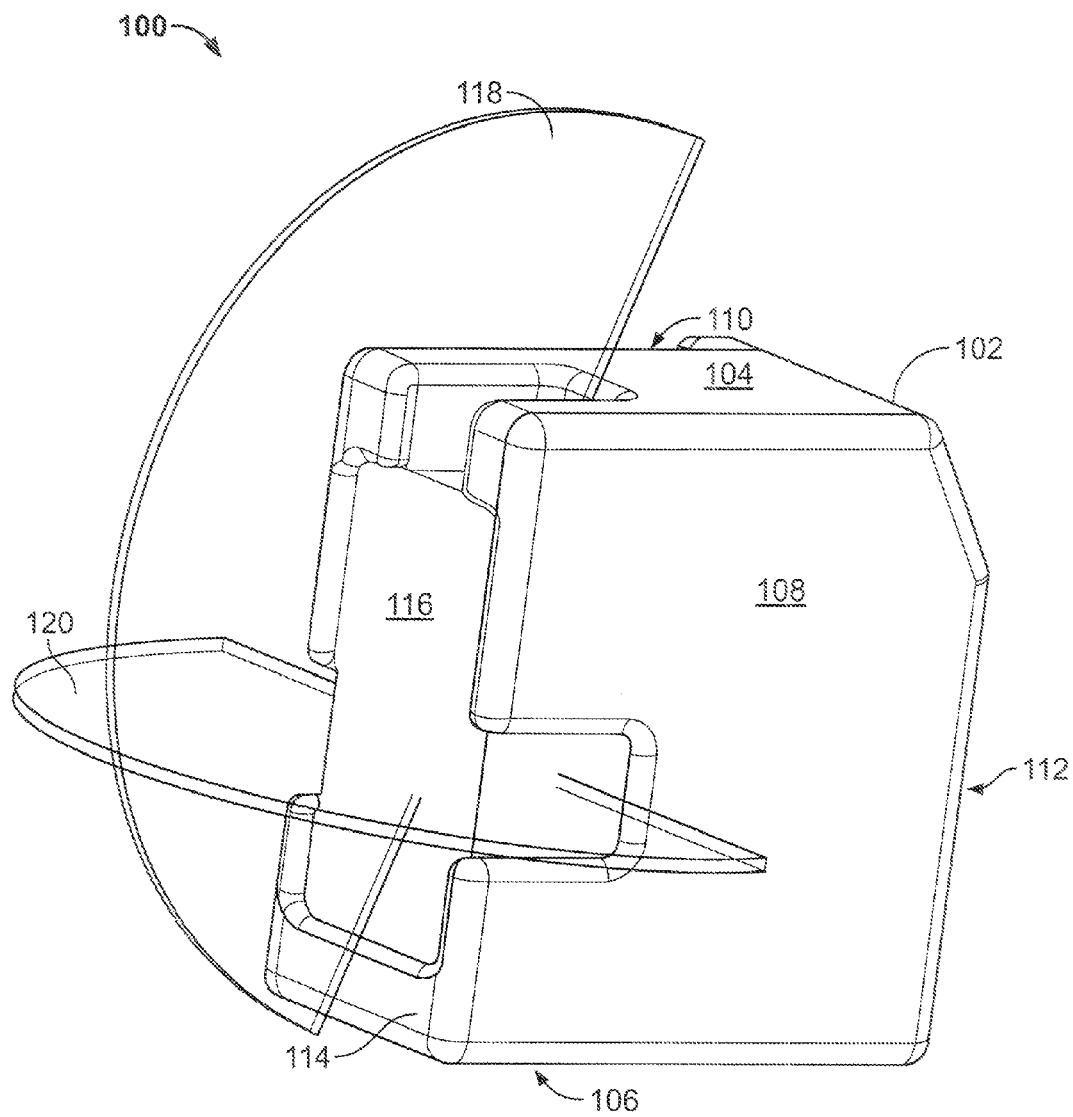
FIG. 1 is a laser-based tool and a schematic representation of two output beams.

Referring to FIG. 1, a laser alignment tool 100 is shown capable of indicating level, plumb and square alignment. The tool 100 includes a housing 102 having a window 116, from which output beams 118, 120 are projected. The beams 118, 120 have a substantially perpendicular arrangement with each other and form vertical and horizontal alignment indicators respectively. In one implementation, an alignment indicator can be the image of a substantially straight line on the surface against which an output beam is projected. In another embodiment an alignment indicator can be a point of light on a surface against which the output beam is projected. Alternatively, two or more points of light can be projected, connected by an imaginary straight line, the straight line being an alignment line, and the points of light used as alignment indicators.

The vertical alignment indicator 118 can be used to indicate plumb, the horizontal alignment indicator 120 can be used to indicate level, and both alignment indicators 118, 120 together can be used to indicate square. In the embodiment shown, the housing includes an upper wall 104; a base 106; side walls 108, 110; a rear wall 112; and a front wall 114. The front wall 114 and portions of the side wall 108, 110 and upper wall 104 include the window 116. Although in the embodiment shown, the window 116 extends across multiple faces, the vertical and horizontal output beams 118, 120 both emanate from a single face of the tool. Other embodiments are possible, such as a housing including rounded walls or a cylindrically shaped housing, or a differently configured window 116, e.g., one or more circular shaped windows.

The tool 100 includes a projection system or unit for projecting the output beams 118, 120, wherein a light source and all necessary optical components for projecting the output beams are mounted in a fixed relationship to each other, preferably in a single unit. A self-leveling feature includes pendulously suspending the projection unit from a support frame, for example, by a gimbal mount, or other methods of pendulous suspension, such as by a spring or wire flexures, as known in the art. In one implementation, a self-aligning platform driven by a servo-motor and controlled by one or more sensors can be used. The tool 100 is preferably operated by setting the base 106 on a substantially level surface, however the self-leveling feature can allow for accurate level and plumb alignment indicators when the tool 100 is inclined within a certain range from horizontal, referred to herein as the "accuracy range".

Figure 2A:
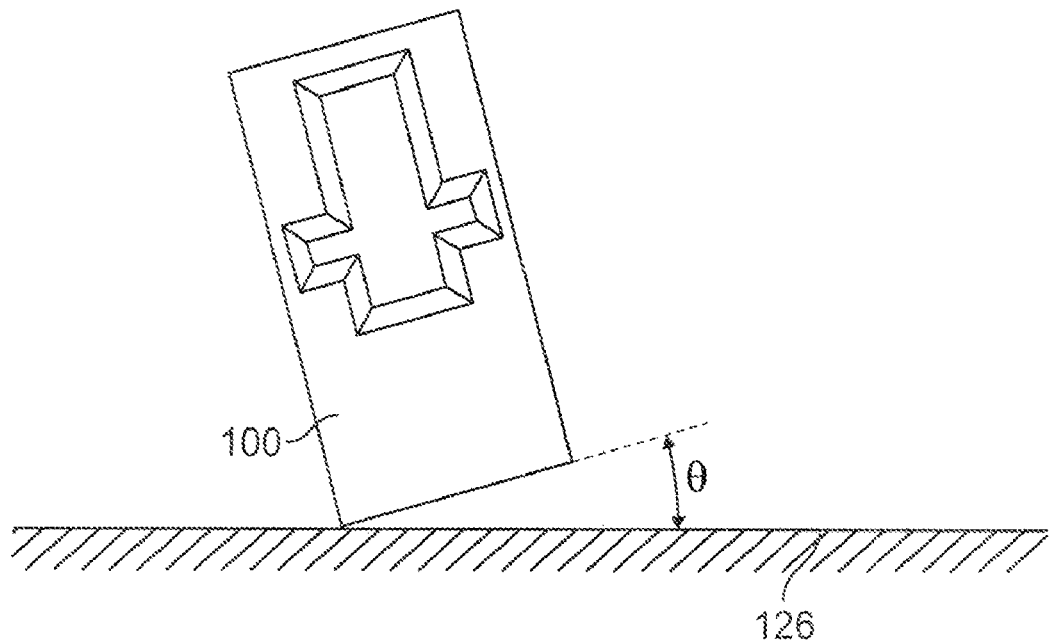
FIG. 2A is a front view of the laser-based tool of FIG. 1 tilted to one side.
Figure 2B:
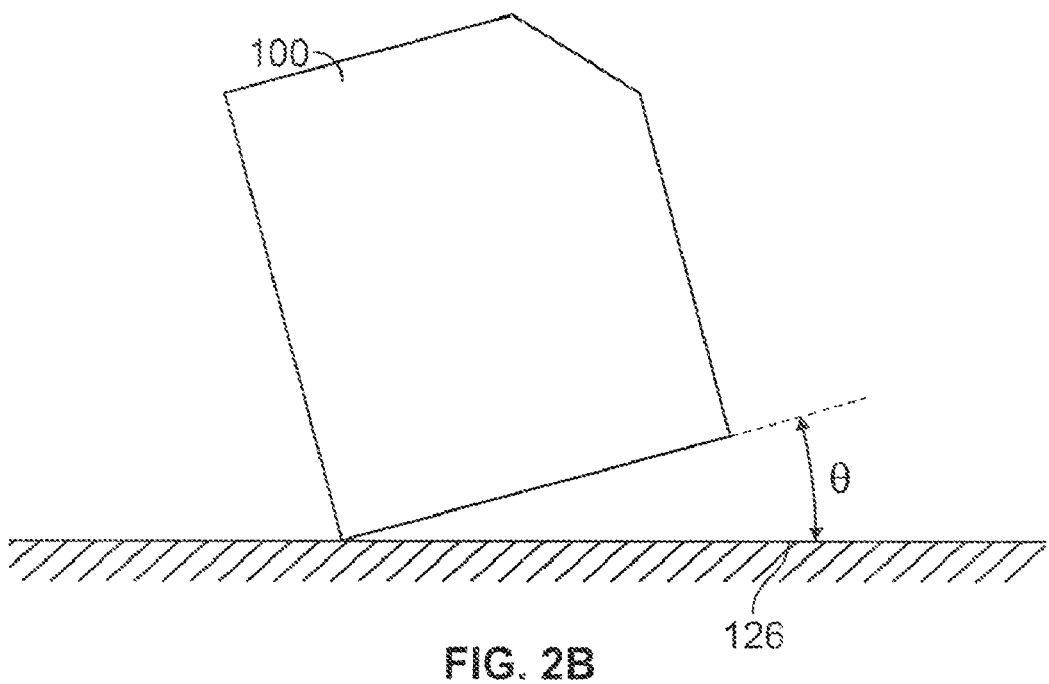
FIG. 2B is a side view of the laser-based tool of FIG. 1 tilted to one end.

Referring to FIGS. 2A and 2B, the tool 100 is shown as tilted from side-to-side at an angle θ from a horizontal plane 126 (FIG. 2A), and tilted from front-to-back at an angle θ from the horizontal plane 126 (FIG. 2B). The accuracy range, meaning the range of angle θ within which the tool 100 can provide accurate level and plumb alignment indicators, depends in part on the geometry of the tool 100. In the embodiment shown, where the tool 100 is sized to fit comfortably within the palm of a human hand, the accuracy range is between approximately 0° and plus or minus a maximum inclination in the range of approximately 4 to 7 degrees from horizontal. However, in another embodiment having a larger housing, for example, the accuracy range can be approximately plus or minus 0 to 9 degrees from horizontal.

The tool 100 can include an error indicator that operates to notify a user when the tool 100 is inclined from horizontal beyond the accuracy range, thereby compromising the integrity of the plumb and level alignment indicators 118, 120. The error indicator can include a cut-off mechanism that cuts off power to the laser emitting diodes when the cut-off mechanism senses the housing is inclined beyond the accuracy range, ceasing projection of the output beams. An example of such a cut-off mechanism is described in U.S. Pat. No. 5,144,487, issued Sep. 1, 1992, for "Portable Laser Device for Alignment Tasks" to William Hersey, the entire contents of which are hereby incorporated by reference. In this manner, the user is notified that the tool 100 is inclined beyond the accuracy range, and the tool 100 is effectively disabled, thus not allowing the inadvertent use of inaccurate level and plumb alignment indicators. A further example of a cut-off mechanism is described below in reference to FIG. 11. In another embodiment, the error indicator can be a mechanism causing the output beams to blink.

Although the alignment indicators 118, 120 may not accurately indicate plumb and level when the tool 100 is inclined beyond the accuracy range, the indicators 118, 120 together can still accurately indicate a square alignment. That is, the alignment indicators 118, 120 maintain their perpendicular relationship to one another, and although not indicating true horizontal or true vertical, can still indicate a true 90° angle. A drawback of the error indicators described above is that the tool 100 is effectively disabled once inclined beyond the accuracy range, thus not permitting a user the option of using the tool 100 to indicate square alignment outside the accuracy range.

Figure 3:
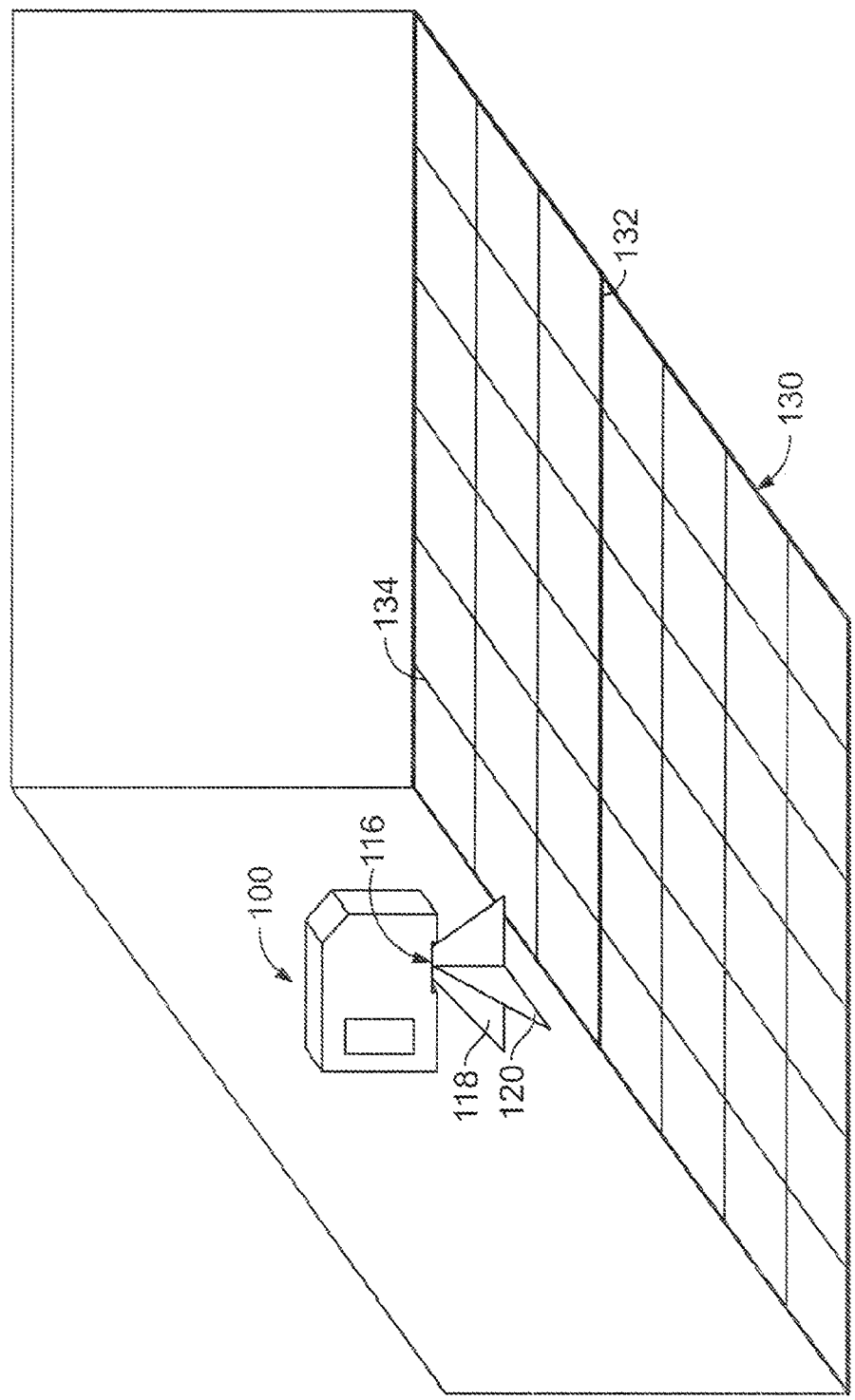
FIG. 3 is a schematic representation of a laser-based tool projecting alignment lines onto a floor surface.

To allow a user the option of using the tool 100 to indicate square alignment when the tool 100 is inclined beyond the accuracy range, the tool 100 further includes an override mechanism, allowing a user to deactivate the error indicator. The tool 100 can therefore be used to indicate square alignment when in virtually any position, without regard to the accuracy range that is relevant only to the level and plumb alignment indicators. Referring to FIG. 3, a use for the tool 100 when inclined beyond the accuracy range is exemplified. In this example, a user requires square alignment indicators to be projected onto a floor 130, for the purpose of laying tiles square to one another on the floor surface. By deactivating the error indicator, the tool 100 can be inclined at 90° from horizontal, such that the window 116 is substantially parallel with the floor 130 and output beams 118, 120 are directed toward the floor 130, providing square alignment indicators 132, 134 on the floor surface. A variety of other uses in the construction and carpentry trades, for example, are also imaginable, such as projecting alignment indicators on a ceiling for mounting lighting fixtures.

Figure 4:
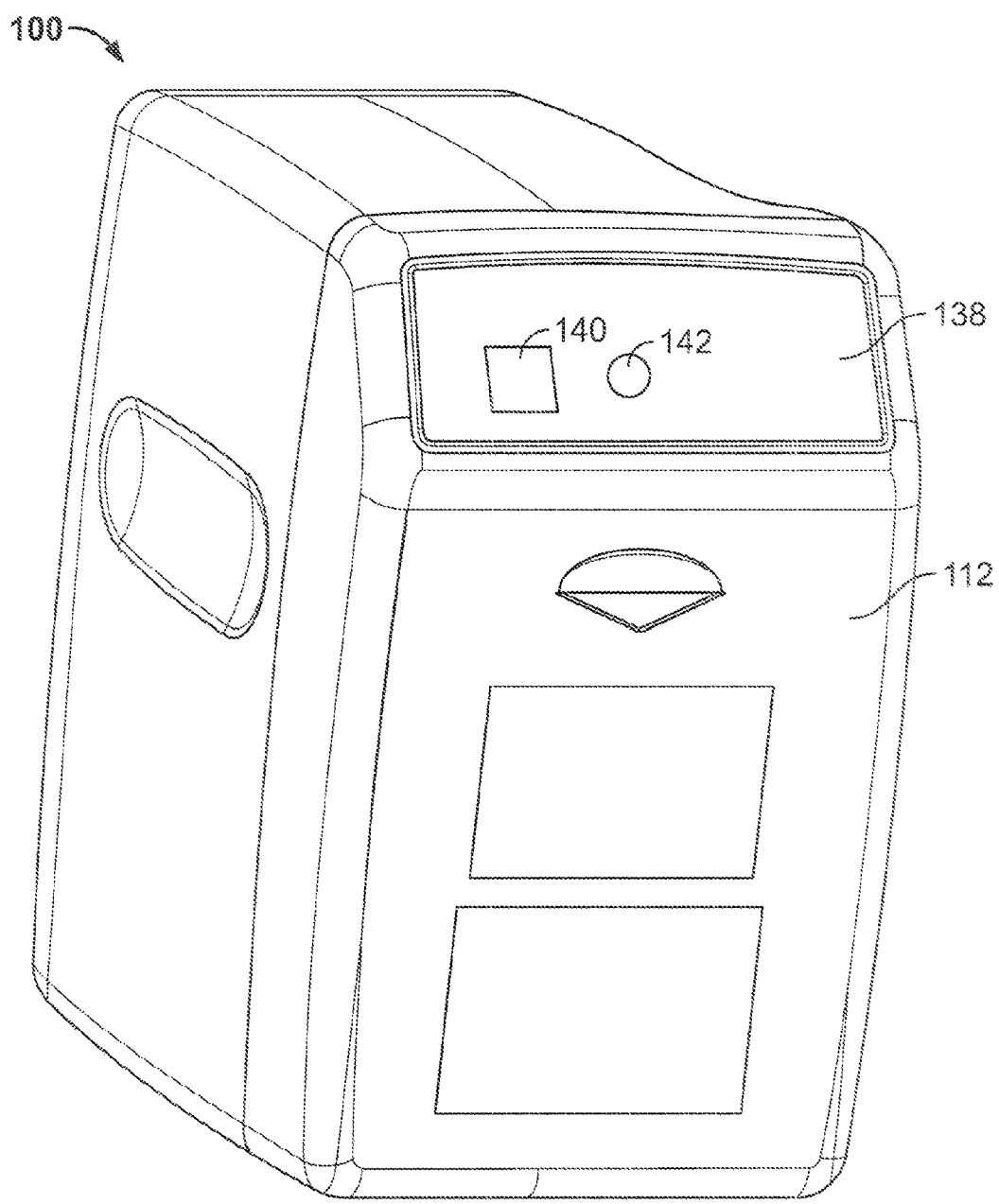
FIG. 4 is a rear view of the laser-based tool of FIG. 1.

In one embodiment, the tool 100 can include a user-friendly interface for interacting with a user. Referring to FIG. 4, the rear wall 112 of the tool 100 is shown. The rear wall has an inclined portion 138, which includes a button 140 and a light 142. In this embodiment, a user can operate the tool 100 as follows. Starting with the tool 100 powered down, the light 142 is not illuminated, indicating the tool 100 is in the OFF position. A first press of the button 140 powers up the tool 100 and projects the horizontal linear output beam 120, providing a horizontal alignment indicator, with the error indicator activated. The light 142 shines green, indicating that the power is ON, and that the error indicator is activated.

A second press of the button 140 turns off the horizontal output beam 120, and projects the vertical linear output beam 118, providing a vertical alignment indicator. The light 142 continues to shine green, indicating the power is ON and the error indicator is activated.

A third press of the button 140 turns on the horizontal linear output beam 120, projecting both output beams and providing both horizontal and vertical alignment indicators 120, 118. The light 142 shines green, indicating the power is ON and the error indicator is activated.

A fourth press of the button 140 causes the override mechanism to deactivate the error indicator. The output beams continue to be projected, providing both horizontal and vertical alignment indicators. The light 142 now shines red, indicating that the power is ON, but that the error indicator has been deactivated. By changing the color emitted from the light 142, the user is notified that the error indicator is not activated, and that the tool 100 may provide inaccurate level and plumb alignment indicators, although the alignment indicators can still be used to provide square alignment.

A fifth press of the button 140 powers down the tool 100, and the light 142 does not shine, indicating the tool 100 is in the OFF position. The next press of the button 140 would start the above described cycle over again.

The user interface shown in FIG. 4 is one embodiment: however, any other convenient arrangement can be used to interact with a user, such as multiple buttons, an LCD or the like.

Figure 5A:
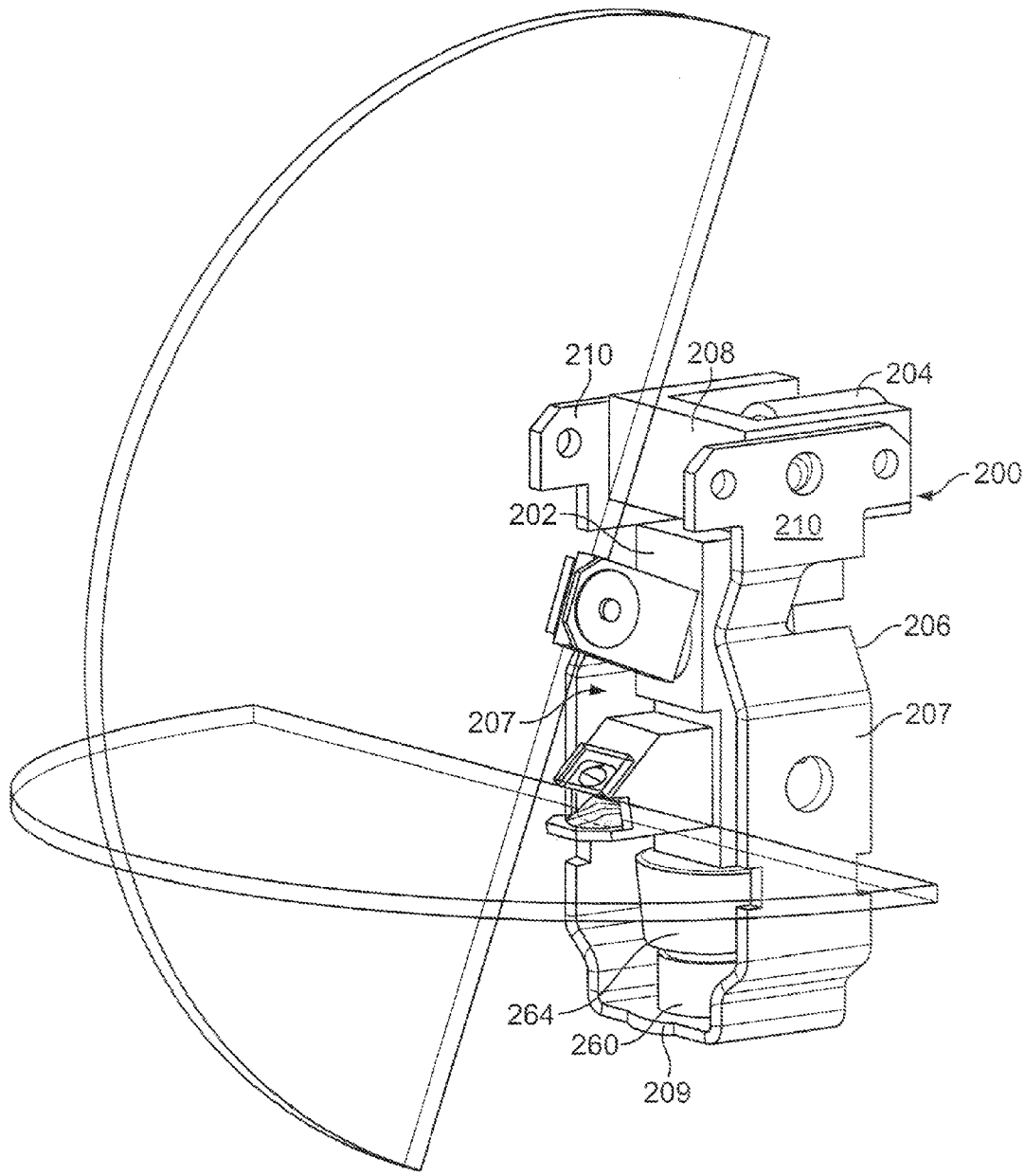
FIGS. 5A and 5B show a support frame of a laser-based tool.
Figure 5B:
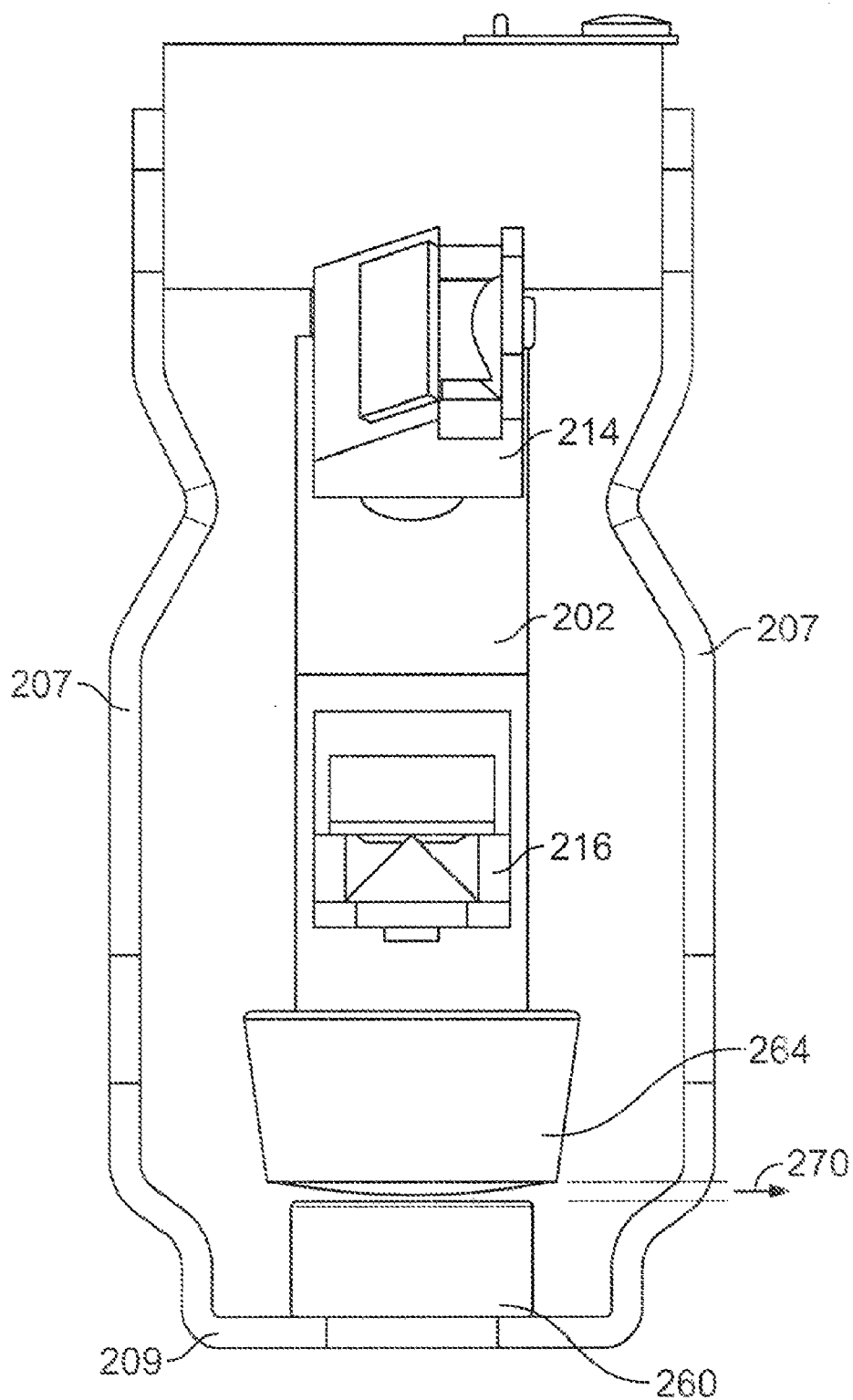

In one embodiment, the error indicator and override mechanism can be embodied in an implementation of the tool 100 as follows. Referring to FIGS. 5A and 5B, the tool 100 can include a support frame 200, located within the tool housing 102, from which a projection unit 202 can be pendulously suspended by a gimbal mount 204.

Referring particularly to FIGS. 5A and 5B, the support frame 200 includes a generally U-shaped, rigid portion 206 forming two sidewalls 207 and a base 209. An upper portion 208 is attached within the U-shaped portion 206, for example, by using screws, and provides a receiving surface for a gimbal mount 204 used to suspend the projection unit 202. The U-shaped portion 206 and upper portion 208 are preferably made from a metal, such as aluminum, that is sufficiently rigid, yet lightweight. Other metals can be used, for example, stainless steel. Soft, padded members can be positioned on either side of the upper portion to absorb impact on the tool 100 typical to its use in the construction and carpentry trades. An energy absorbent stop [see 212 in FIG. 11A] can be positioned within the U-shaped member to limit motion of the projection unit 202 when suspended within the support frame 200. The padded members and stop can be made of rubber, such as 40 durometer EPDM rubber. A magnet 260, used in a damping system described further below, is affixed to the interior of the base of the U-shaped portion 206.

Figure 5C:
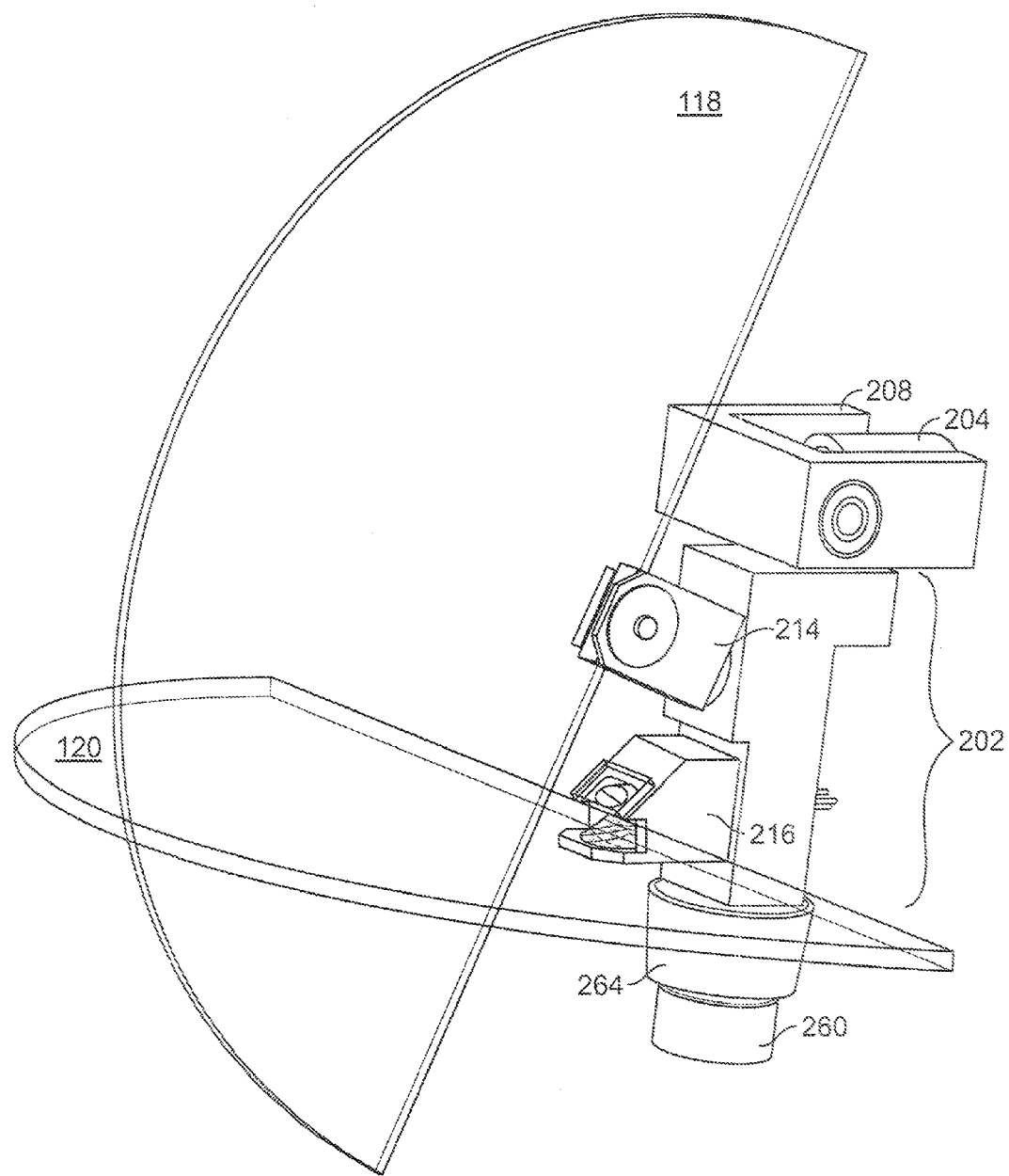
FIG. 5C shows a projection unit of a laser-based tool.
Figure 6:
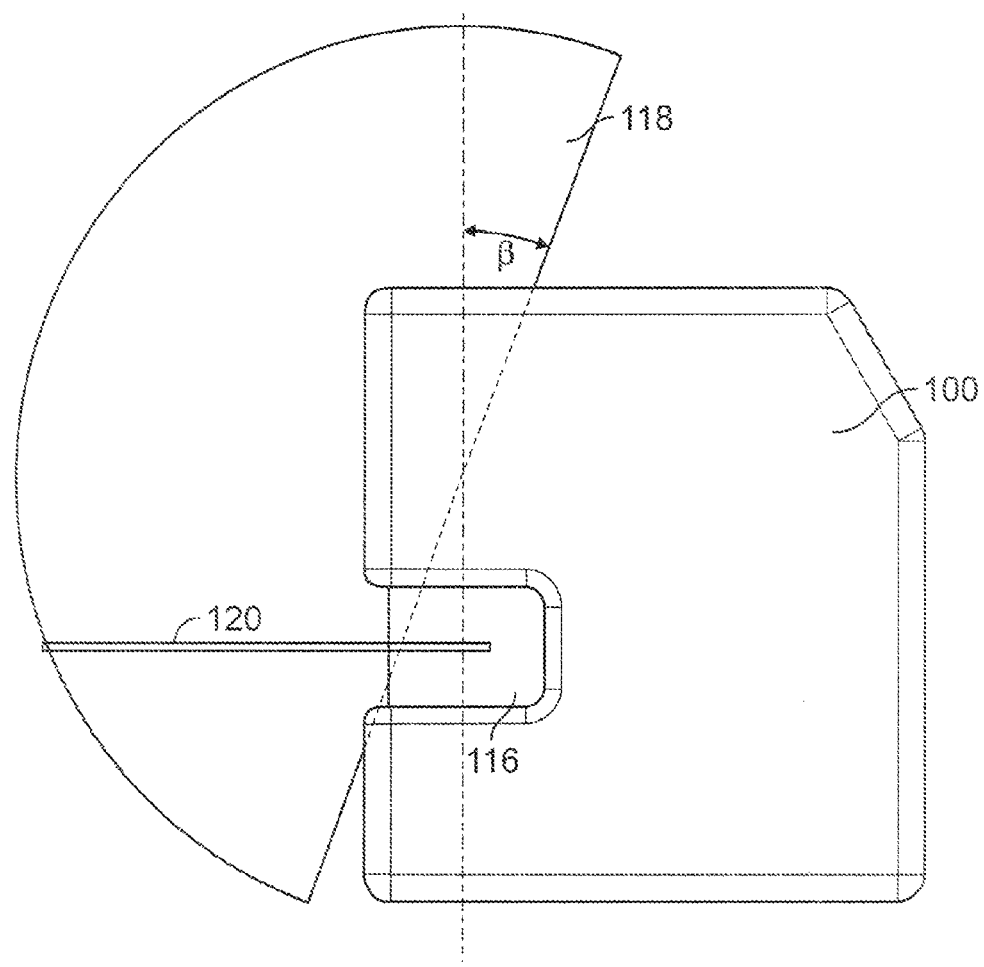
FIG. 6 is a side view of the laser-based tool of FIG. 1 including a schematic representation of two output beams.

Referring particularly to FIG. 5C, the projection unit 202 includes a vertical projection module 214 and a horizontal projection module 216. The vertical projection module 214 projects beam 118 and fans approximately 180°. In the implementation shown, the beam 118 is projected at an angle of β from vertical, as shown more clearly in FIG. 6. This implementation allows the plumb beam to project overhead and behind the tool 100, even when the tool 100 is held relatively close to a surface (e.g., a wall) directly in front of the tool. Having the beam project overhead and behind in this manner can be desirous for performing certain tasks. In other implementations, the beam 118 can be projected with no angle (i.e., β=0) or can be projected downwardly, i.e., in the opposite direction. The angle β can vary depending on the desired projection path of the beam 118. In one implementation, the angle β is approximately 15°.

Figure 7:
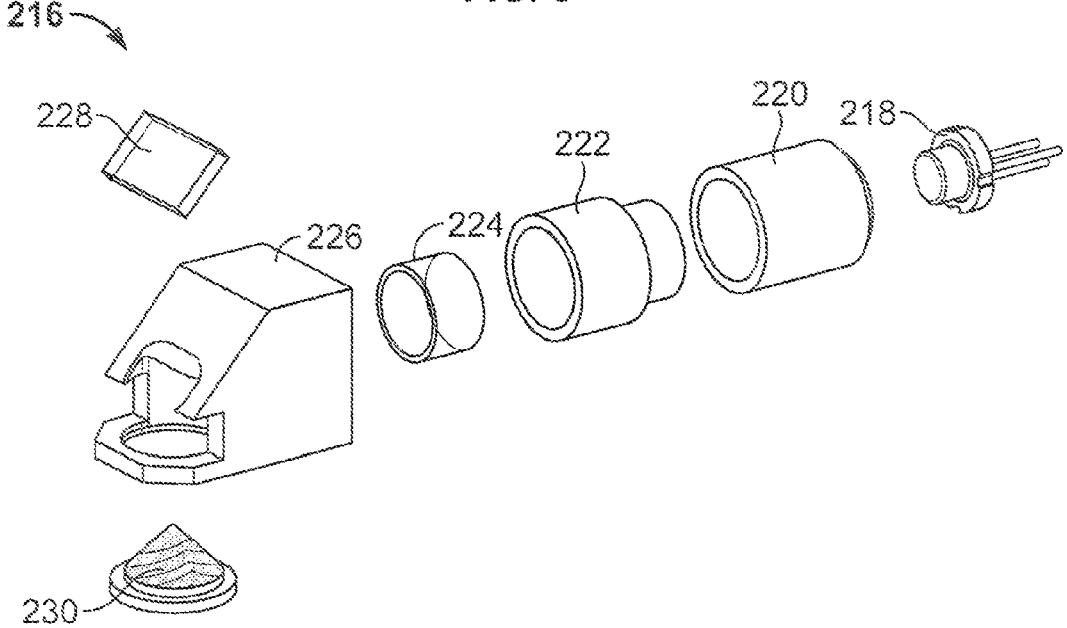
FIG. 7 is an exploded view of a horizontal projection module.

The horizontal projection module 216 projects beam 120 and fans approximately 180°. Referring to FIG. 7, an exploded view of the horizontal projection module 216 is shown. The horizontal projection module 216 includes a laser emitting diode 218 mounted within a diode mount 220. The diode mount 220 couples to a lens mount 222 used to mount a lens 224. In this implementation, the lens 224 is an aspheric lens. The lens 224 and lens mount 222 couple to the main body 226 of the horizontal projection module 216. The path of a laser beam emitting from the laser emitting diode 218 is deflected by a flat mirror 228 and a reflective conical surface 230, as described in further detail below.

In one implementation, the laser emitting diode 218 can be selected to emit visible light having a wavelength between about 630 to 650 nanometers (nm), such as model DL-4038-31 available from Sanyo Semiconductor Corporation in San Diego, Calif., and model HL6332G available from Hitachi Semiconductor (America) Inc. of San Jose, Calif., which emit visible light at a wavelength of 635 nm at a power of 10 milliwatts. In other implementations, different diodes can be used.

Figure 8A:
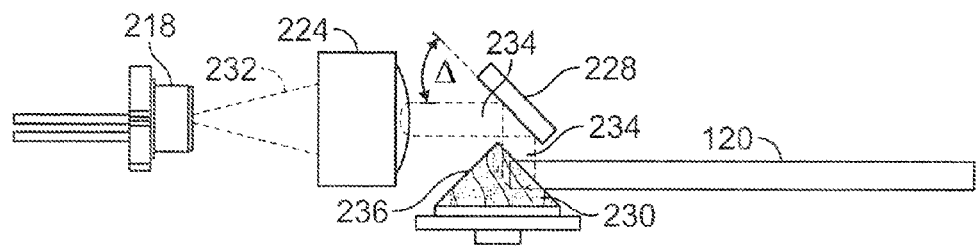
FIGS. 8A and 8B are schematic representations of the paths of laser beams within the horizontal projection module shown in FIG. 7.
Figure 8B:
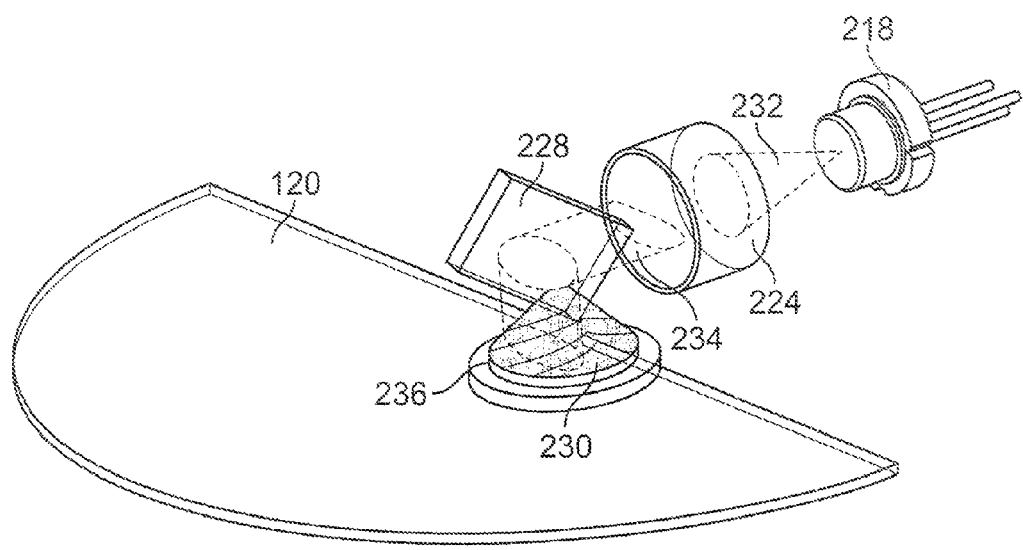

Referring to FIG. 8A, an enlarged side view of the horizontal projection module 216 is shown with the path of the laser beam emitted from the laser emitting diode 218 illustrated. For illustrative purposes, not all elements of the horizontal projection module 216 are shown, for example, the mounting elements 220, 222 and the main body 226 are not displayed. The laser beam 232 initially emits from the laser emitting diode 218 and is incident on the lens 224. In this implementation, the laser emitting diode 218 emits an elliptically shaped laser beam 232 that is expanding at approximately 8 degrees in one axis and 30 degrees in a perpendicular axis. Passing the laser beam 232 through the lens 224 has the effect of producing a collimated beam 234 maintaining the elliptical cross-section, as depicted more clearly in FIG. 8B. The beam 234 is incident on the plane mirror 228 at an angle Δ. In the implementation shown, the angle Δ is approximately 45°. If the angle varies substantially from 45°, the intensity of the beam incident on the partial-conical reflective surface 230 is affected. The plane mirror 228 diverts the beam 234 downwardly toward the partial-conical reflective surface 230. The partial-conical reflective surface 230 fans the beam 234 out into the approximately 180° fanned output beam 120.

In the implementation shown, the partial-conical reflective surface 230 is approximately one half (i.e., 180°) the surface of a cone 236. In another implementation, a semi-cone can be used, since only half of the surface of a full cone is used. The cone 236 is positioned beneath the plane mirror 228 such that the beam 234 is incident on only the front face of the cone 236, the front face being the partial-conical reflective surface 230. By only reflecting the beam 234 from the partial-conical reflective surface 230 (i.e., the front face), the beam 234 is fanned out by only 180°. By contrast, if the beam 234 were incident on the apex of the cone 236, the beam 234 would fan out 360°. In this implementation, since the fanned output beam 120 projects in front of the tool 100, the remaining 180° of a fanned 360° beam would be wasted, i.e., reflected back into the tool 100, and the output beam 120 would be less intense than if the beam 234 is entirely reflected off of just the front face of the cone 236. Accordingly, by positioning the cone 236 beneath the plane mirror 228 as shown, so that the beam 234 is incident on just the front face of the cone 236, the resulting fanned laser beam is concentrated in the desired 180° fanned direction.

In other implementations, more or less of the surface of the cone can be used to reflect the beam 234 either less than or greater than 180°, by shifting the position of the cone 236 relative to the plane mirror 228.

Figure 9A:
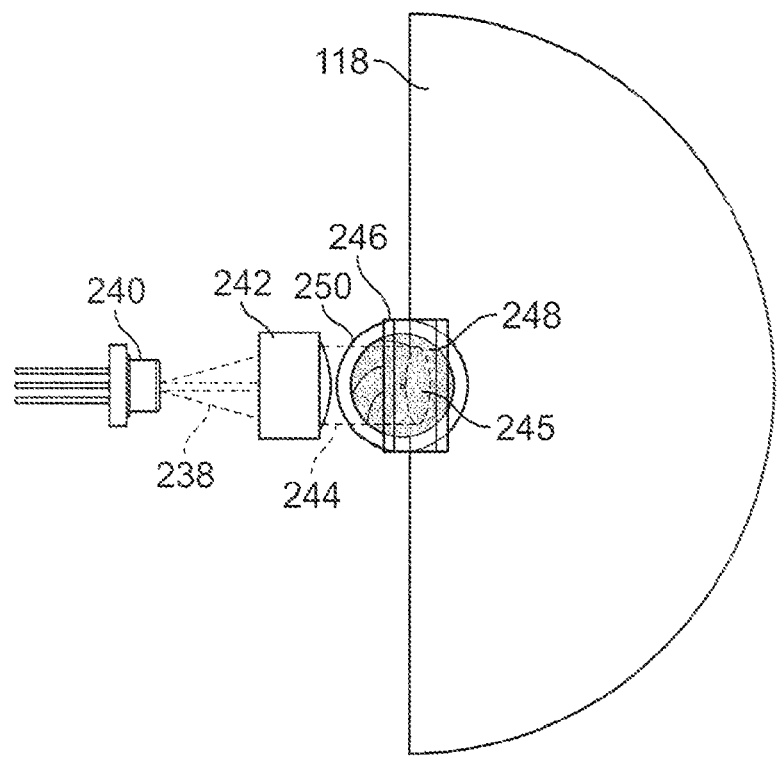
FIG. 9A is a schematic representation of a path of a laser beam within a vertical projection module.
Figure 9B:
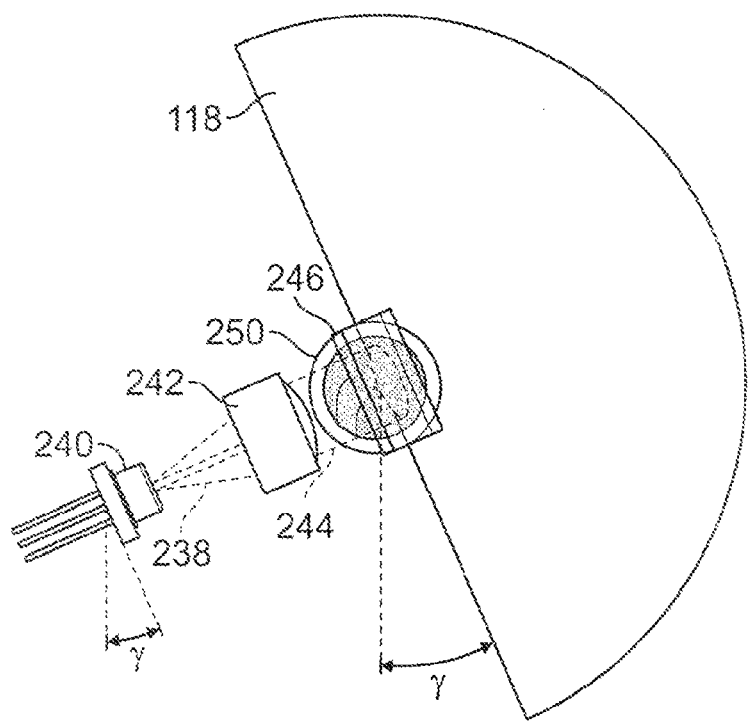
FIG. 9B is a schematic representation of a path of a laser beam within a vertical projection module mounted at an angle.

The path of a laser beam within the vertical projection module 214 is similar to what was described above with respect to the horizontal projection module 216, however, the entire module is rotated by approximately 90 degrees about its own axis. Referring to FIGS. 9A and 9B, the laser beam path for the vertical projection module 214 is shown. Again, for illustrative purposes, not all elements of the vertical projection module 214 are shown, in particular, the mounting elements and the main body are not displayed. The laser beam 238 initially emits from the laser emitting diode 240 and is incident on the lens 242. In this implementation, the laser beam 238 has an elliptical cross-section. Passing the laser beam 238 through the lens 242 has the effect of producing a collimated beam 244, maintaining the elliptical cross-section, as depicted more clearly at reference numeral 245. The long axis of the beam 244 is orientated vertically, as compared to the long axis of the beam 234 in the horizontal projection module 216, which is orientated horizontally. The beam 244 is incident on the plane mirror 246 at an angle. In the implementation shown, the angle is approximately 45°. The plane mirror 246 diverts the beam 244 laterally toward the partial-conical reflective surface 248. The partial-conical reflective surface 248 fans the beam 244 out into the approximately 180° fanned output beam 118.

As described above in reference to the horizontal projection module 216, in the implementation shown, the partial-conical reflective surface 248 is approximately one half (i.e., 180°) the surface of a cone 250. In another implementation, a semi-cone can be used, since only half of the surface of a full cone is used. The cone 250 is positioned relative to the plane mirror 246 such that the beam 244 is incident on only the front face of the cone 250, the front face being the partial-conical reflective surface 248. By only reflecting the beam 244 from the partial-conical reflective surface 248 (i.e., the front face), the beam 244 is only fanned out 180°.

Referring to FIG. 9B, in one implementation, the vertical projection module 214 can be orientated at an angle γ relative to vertical. As result, the projected output beam 118 angles upwardly at the angle γ. As discussed above, angling the output beam 118 in this manner provides the plumb line not only directly in front of the tool 100, but above and behind the tool 100. In some applications, having the plumb beam projecting overhead (e.g., onto a ceiling) can be desirous. In one implementation, the angle γ can range between approximately 0 to 30 degrees.

Figure 10A:
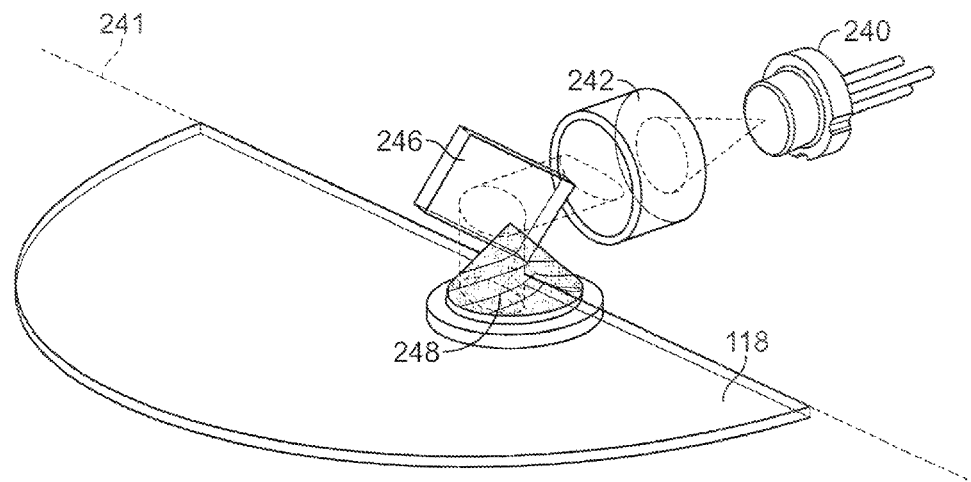
FIGS. 10A and 10B are schematic representations of a path of a laser beam in a projection module.
Figure 10B:
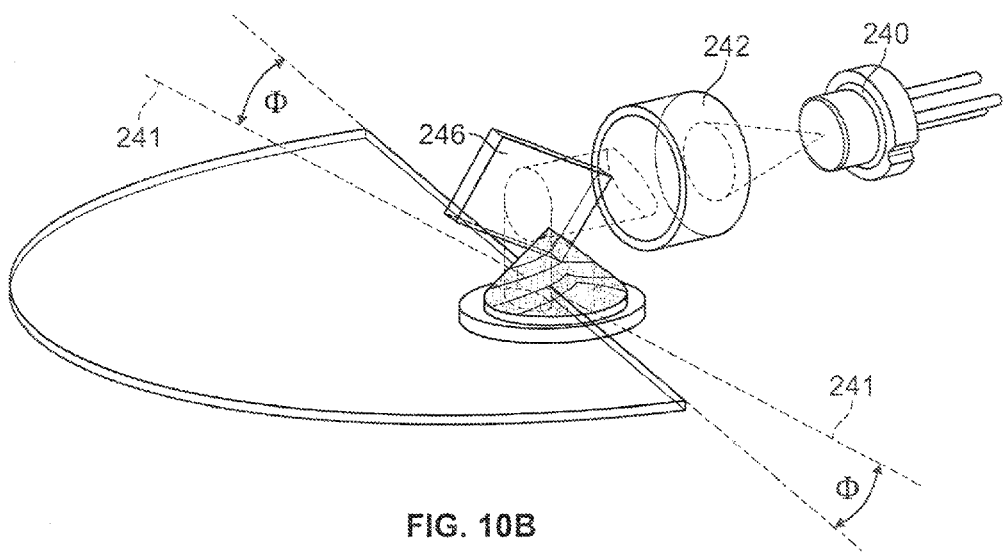

Referring to FIGS. 10A and 10B, an angled output beam can alternatively be achieved by rotating the laser emitting diode 240 relative to the plane mirror 246, rather than angling the entire vertical projection module 214. FIG. 10A shows a projection module, which can be either the vertical or horizontal projection module. For illustrative purposes, we shall describe the figures in reference to the vertical projection module 214. In FIG. 10A, the laser emitting diode 240 is orientated parallel to an axis 241 representing a vertical orientation of the output beam 118. The laser beam is diverted by the plane mirror 246, incident on the partial-conical reflective surface and reflected as the substantially 180° fanned output beam 118 having a vertical orientation. In FIG. 10B, the laser emitting diode 240 has been rotated such that the long axis of the elliptically shaped laser beam exiting the lens 242 is at an angle as compared to the long axis of the laser beam shown in FIG. 10A, i.e., at an angle relative to a vertical orientation. As a result, the laser beam is incident on a different portion of the cone 250, although still only over a span of approximately 180°. The reflected, fanned output beam is therefore still fanned at substantially 180°, but angled by the same angle relative to the output beam shown in FIG. 10A, i.e., angle Φ.

The fanned vertical and horizontal linear output beams 118, 120 project vertical and horizontal alignment indicators respectively. The brightness of the projected alignment indicators can vary, depending in part on the strength of the laser beam emitted from the laser emitting diode. An implementation using the laser emitting diodes described above can produce highly visible, bright alignment indicators.

In the implementation described above, the laser emitting diodes 218 and 240 emitted laser beams with an elliptical cross-section. In other implementations, the emitted laser beams can have different cross-sections, e.g., circular or oval. In the implementation described above a plane mirror 228 and 248 was used to divert the laser beams emitted from the laser emitting diodes 218, 240. A plane mirror is just one example of a planar reflective surface that can be used to divert the laser beams and other configurations of planar reflective surfaces can be used.

In the implementation described above, the laser beams emitted from the laser emitting diodes 218, 240 were collimated by a lens 224, 242, and in particular an aspheric lens. In other implementations, different configurations of optical elements can be used to collimate the laser beams.

In the implementation described above the partial-conical reflective surfaces 230, 248 were formed on cones 236, 250. The cones 236, 250 can be full cones, as shown, or can be partial cones. In one implementation, the cones 236, 250 are made from diamond turned aluminum. Other configurations of cones can be used, for example, a cast glass cone or a mirrored glass cone. The apex angle of the cones 236, 250 is substantially 90°. If the apex angle varies significantly from 90°, the resulting output beams tend not to be planar, but rather flare up at the edges.

In the implementation described above, two projection modules were included, both a vertical and horizontal project module 214, 216. In other implementations, more or fewer projection modules can be included. The configuration of the projection modules relative to one another can vary. For example, although in the implementation described, both output beams emanated from a single face of the tool, in other implementations it may be desirable to have one or more output beams emanate from different faces of the tool.

An important feature of a portable laser alignment device is to contain the device within a relatively small housing. The tool 100 is configured such that the tool 100 can fit comfortably within the palm of a human hand, and is sufficiently lightweight to allow a user to operate the tool while holding it in one hand, and conveniently carry it on a tool belt when not in use. The use of a planar reflective surface to divert the laser beam path plays an important role in allowing the tool 100 to be configured into such a small footprint. Both the vertical and horizontal output beams can be projected from the same face of the tool, allowing for a more compact design.

The projection unit 202 can include a damping system to limit pendular motion when the tool is set down on a surface, such as the damping system described in U.S. Pat. No. 5,144,487, previously incorporated herein by reference. Referring again to FIG. 5B, such a damping system can include the magnet 260 secured to the inside of the base 206 of the support frame 200, and a copper damping plate 264 attached to a lower surface of the projection unit 202. The damping plate 264 is formed and positioned such that a precise gap 270 is maintained at a predetermined width when the damping plate 264 is in motion over the magnet 260. In one implementation, the gap 270 is approximately 0.025 of an inch.

The gap 270 is sufficiently small such that motion of the damping plate 264 causes eddy currents to be generated in the plate 264. Interaction of the eddy currents in the damping plate 264 with the magnetic field of the magnet 260 causes damping of pendular motion of the projection unit 202. The damping force may depend on the mass and thickness of the magnet 260, the dimension of the gap 270 and the thickness of the copper plate 264. Preferably the magnet 260 is a neodymium magnet approximately three-quarters of an inch in diameter and a quarter of an inch thick. The damping plate 264 is preferably three-quarters of an inch thick and has a maximum diameter of 0.625 inches at its widest point and a minimum diameter of 0.500 at its narrowest point. Other types of magnets may be used and other arrangements of one or more magnets may be used to accomplish the damping function, as is known in the art. In addition, other shapes and/or materials can be used for the damping plate, as is also known in the art. Alternatively, the "plate" can be an integral portion of the projection unit.

The laser emitting diodes 218, 240 can be powered by a rechargeable battery located in a battery compartment within the housing 102. The battery is connected to the diodes 218, 240 by a connector extending from the battery terminal. The connector can be an ultraflexible micro-miniature conductor obtainable from New England Electric Wire Company of Lisbon, N.H. The connector is lead to an on-off switch attached to the housing 102. The connector is then lead through the gimbal mount 204 and connected to the laser emitting diodes 218, 240. Leading the connector through the gimbal mount 204 is one technique to ensure the connector has a negligible effect on the balance of the projection unit 202.

Figure 11A:
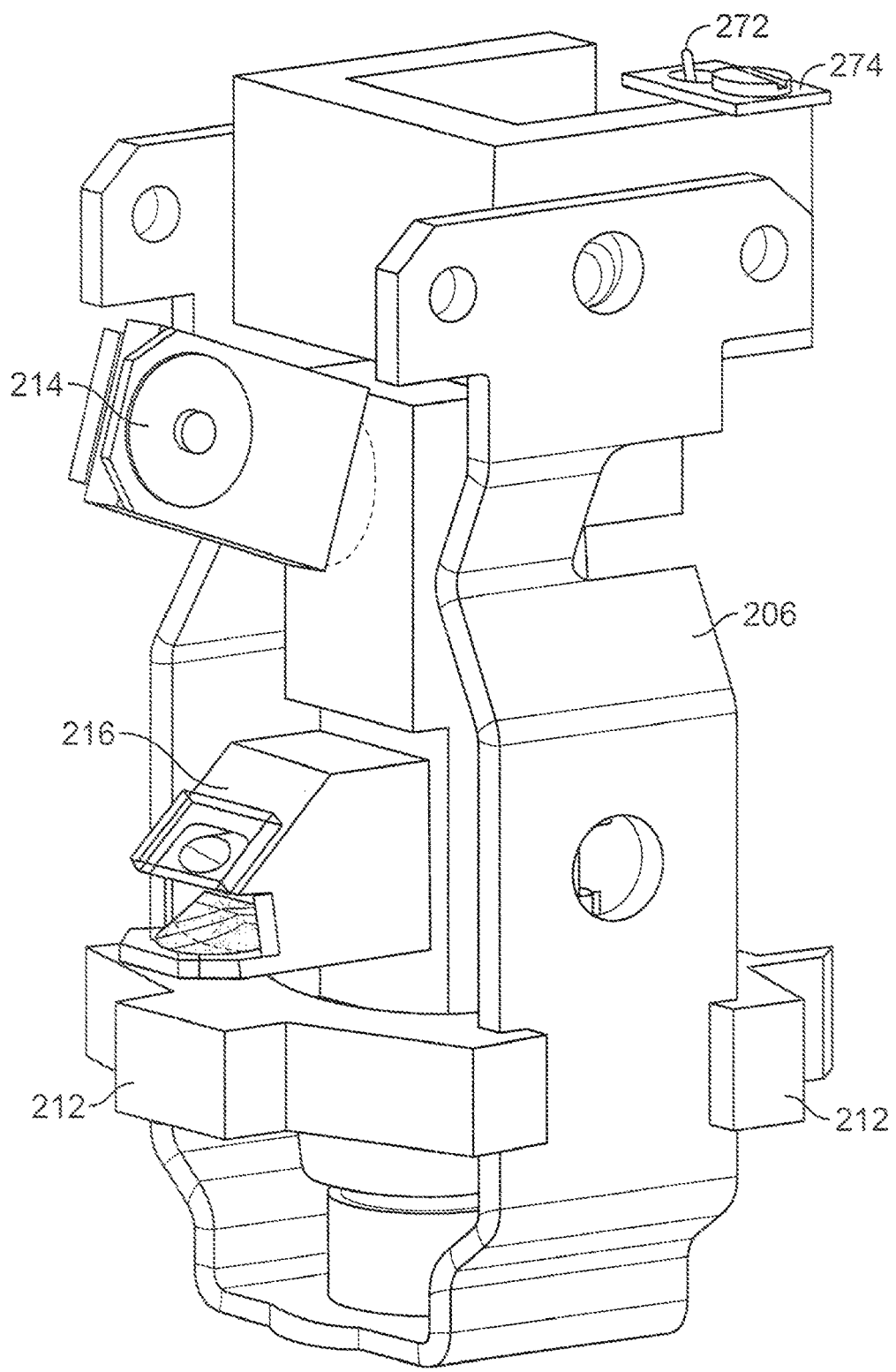
FIGS. 11A and 11B are views of a projection unit and a portion of a support frame.

Provision is made to prevent excessive motion of the projection unit 202 when the tool 100 is set down on a surface which is far from level. Referring to FIG. 11A, an energy absorbent stop 212 is positioned such that when the tool 100 is inclined at approximately plus or minus seven degrees (7°) or greater from the horizontal, the damping plate 264 contacts the stop 212, thus limiting further relative movement between the projection unit 202 and the support frame 200.

As discussed above, the tool 100 can include a cut-off switch that will cut off power to the laser emitting diodes 218, 240 when the housing 102 is inclined in any direction plus or minus a predetermined angle from horizontal. In the embodiment shown, the predetermined angle can be approximately plus or minus 6°, however, the angle can vary depending on the geometry of the tool 100, and, as already discussed above, can be in a range of approximately plus or minus 4 to 9 degrees.

Figure 11B:
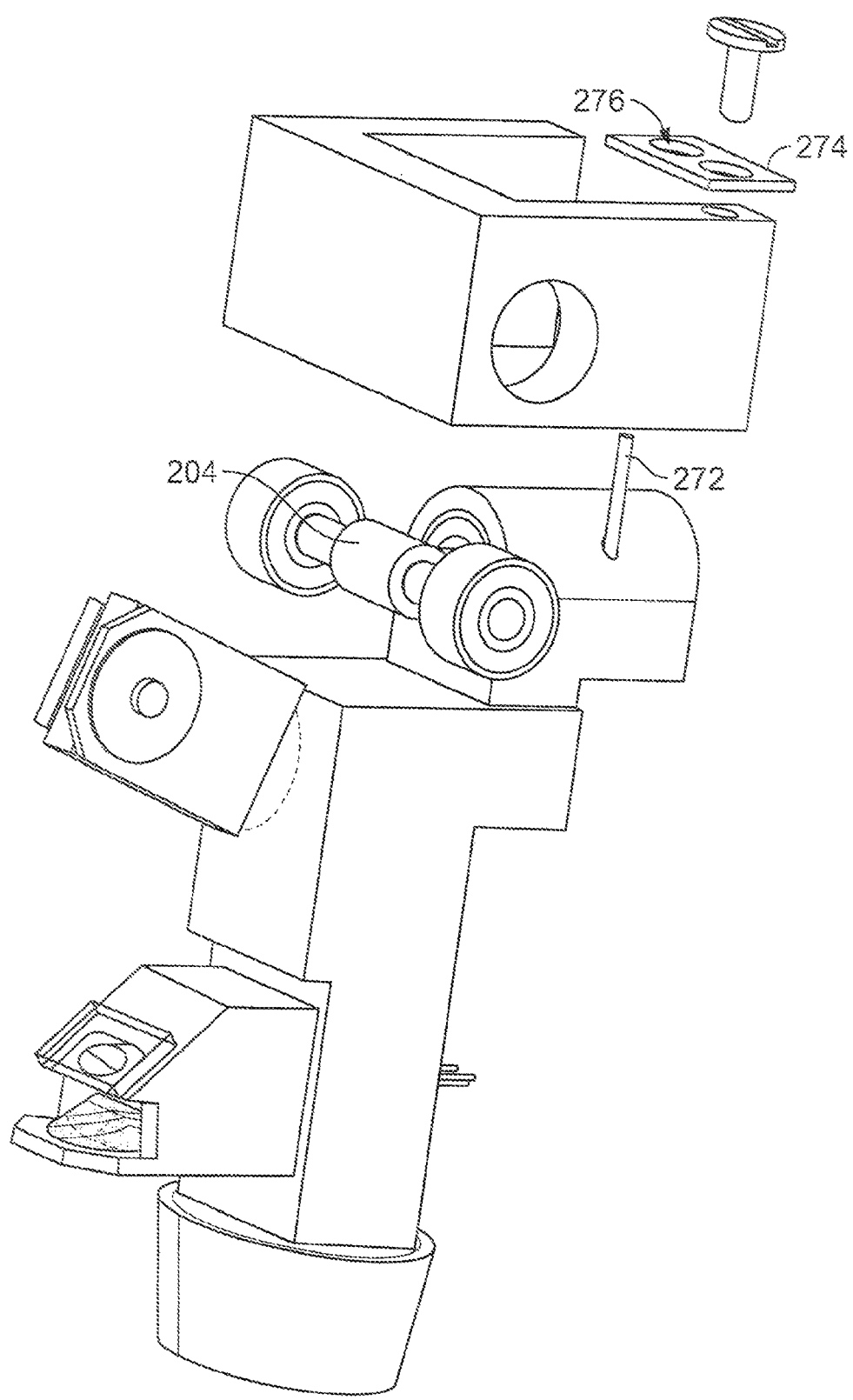

Referring to FIGS. 11A and 11B, views of the support frame 200 and the projection unit 202 are shown. More particularly, in FIG. 11B, a partially exploded view of a portion of the support frame 200 and the projection unit 202 and is shown. The cut-off mechanism can include a wire flexure 272 attached to and protruding above the upper portion of the projection unit 202. The cut-off mechanism further includes a small metal plate 274 attached to the top of the support frame 200, the plate 274 including an aperture 276. The aperture 276 is sized and positioned such that the wire flexure 272 projects through the center of the aperture 276 when the projection unit 202 is suspended from the support frame 200. The wire flexure 272 carries a charge from the projection unit 202, which is charged due to the rechargeable battery used to power the laser emitting diodes 218, 240. When the housing 102 is inclined beyond the accuracy range, for example 7° from horizontal, the wire flexure 272 contacts the metal interior of the aperture 276, which in essence behaves as a contact switch, indicating to the laser power drive that power to the laser emitting diodes 218, 240 should be cut-off, which can be accomplished, in one example, by conventional digital logic. Other embodiments are possible using different cut-off switches, for example, an omni-directional mercury switch.

As discussed above, the tool 100 includes an override mechanism to allow a user to deactivate the cut-off switch described above. As already described with reference to FIG. 4, in one implementation, the user can deactivate the cut-off switch by pressing a button electrically connected to a circuit board mounted to the central core of the projection unit 202. Digital circuitry within the circuit board can be used to deactivate or reactivate the cut-off switch in response to an electrical input received from the button. Other means for deactivating the cut-off switch can also be used, for example, firmware. The circuit board can also control power to the laser emitting diodes 218, 240.

Figure 12A:
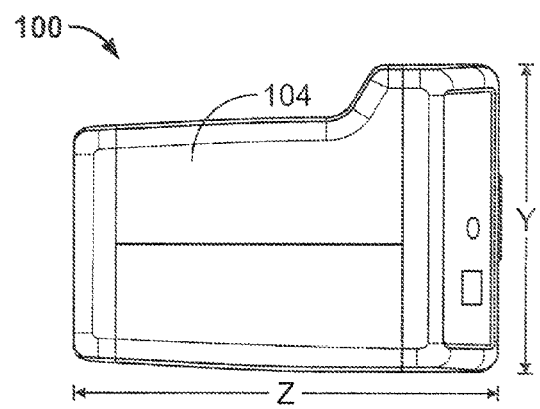
FIGS. 12A-C are top, front and side views respectively of a laser-based tool.
Figure 12B:
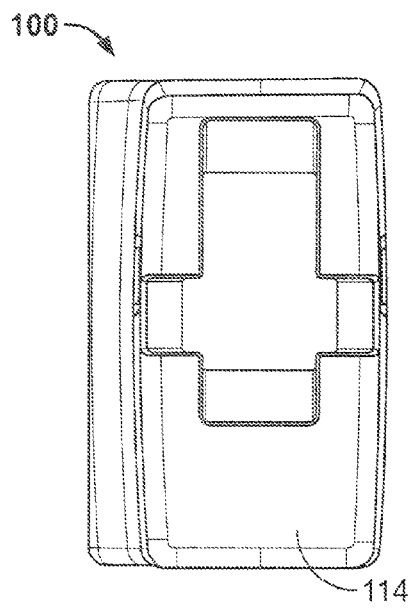
Figure 12C:
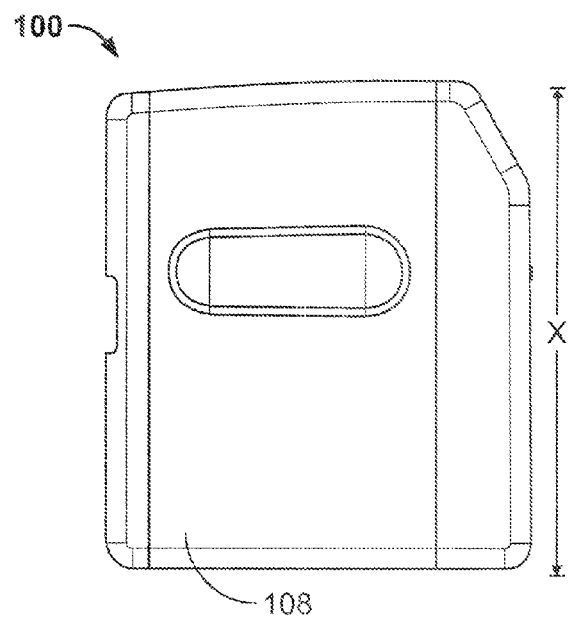

As discussed above, using the plane mirrors in conjunction with the conical reflective surfaces to direct the laser beams, combined with the damping system, advantageously allows the tool 100 to be embodied within a relatively compact housing with a relatively low overall weight. Referring to FIGS. 12A-C, in one embodiment, the tool 100 can be dimensioned to have a height X of approximately 3.3 inches, a width Y of approximately 2 inches and a length Z of approximately 2.8 inches. In this configuration, the tool 100 can have a tool weight of approximately 10 ounces.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for projecting an indication of alignment, comprising:
   a housing, wherein the housing is dimensioned such that the apparatus can fit within the palm of a human hand;
   a projection unit pendulously suspended in the housing to project output beams to indicate level, plumb and square where the projection unit includes a vertical projection module and a horizontal projection module and where each of the vertical and horizontal projection modules include:
      a laser emitting diode to emit a laser beam directly incident on a collimator, the collimator comprising a single lens,
      the collimator configured to collimate the laser beam into a collimated beam and project the collimated beam on a planar reflective surface;
      a planar reflective surface orientated at an angle of approximately 45° to a path of the collimated beam projected from the collimator and configured to divert the path of the collimated beam approximately 90° and toward a partial-conical reflective surface;
      a conical reflective surface formed from at least approximately 180° of an exterior surface of a cone and configured to reflect the diverted collimated beam into an approximately 180° fanned output beam, where the conical reflective surface is positioned relative to the planar reflective surface such that a center of the collimated beam is incident on a front face of the cone and is not incident on the apex of the cone;
   where the vertical projection module generates a substantially vertical output beam and the horizontal projection module generates a substantially horizontal output beam, the vertical and horizontal output beams being projected from the housing in different but generally perpendicularly related directions, whereby the output beams can be used to indicate level, plumb and square alignment; and
   a damper to dampen pendular motion of the projection unit.

2. The apparatus of claim 1, where:
   the vertical projection module and the horizontal projection module are positioned within the apparatus such that the vertical output beam and the horizontal output beam both emanate from a same face of the apparatus.

3. The apparatus of claim 1, where:
each collimator is an aspheric lens and each collimated beam has an elliptically shaped cross-section.

4. The apparatus of claim 1, further comprising:
at least one battery to provide power to the laser emitting diodes of the projection unit.

5. The apparatus of claim 1, further comprising:
an error indicator to indicate when the housing is inclined such that the accuracy of the level and plumb directions are compromised; and
an override to deactivate the error indicator, whereby said output beams can be used at least to indicate square alignment.

6. The apparatus of claim 5, wherein:
the error indicator suspends projection of the vertical and horizontal output beams.

7. The apparatus of claim 5, wherein:
the error indicator indicates the housing is inclined such that the accuracy of the level and plumb directions is compromised, when the housing is inclined in any direction in the range of approximately plus or minus 4 to 9 degrees from horizontal.

8. The apparatus of claim 5, wherein:
the error indicator indicates the housing is inclined such that the accuracy of the level and plumb directions is compromised, when the housing is inclined in any direction more than approximately 9 degrees from horizontal.

9. The apparatus of claim 5, where:
the override includes digital circuitry to deactivate the error indicator in response to a user input.

10. The apparatus of claim 1, where the damper includes:
a magnet mounted in the housing below the projection unit and a damping plate rigidly suspended from the projection unit, such that the damping plate is positioned above the magnet with a gap maintained therebetween sufficiently small that eddy currents are generated in the damping plate by motion thereof above the magnet.

11. The apparatus of claim 1, further comprising:
a user interface configured to receive a user input, wherein:
in response to a first user input, the projection unit projects a horizontal output beam that can be used to indicate level;
in response to a second user input, the projection unit projects a vertical output beam having a generally perpendicular relationship to the horizontal output beam, whereby the vertical output beam can be used indicate plumb;
in response to a third user input, the projection unit projects simultaneously the horizontal and vertical output beams, whereby the output beams can be used to indicate simultaneously level, plumb and square; and
in response to a fourth user input, the override is employed to deactivate the error indicator, and the projection unit simultaneously projects the horizontal and vertical output beams, whereby the output beams can be used to at least indicate square.

12. An apparatus for projecting an indication of alignment, comprising:
a housing, wherein the housing is dimensioned such that the apparatus can fit within the palm of a human hand;
a projection unit pendulously suspended in the housing to project output beams to indicate level, plumb and square where the projection unit includes a vertical projection module and a horizontal projection module and where each of the vertical and horizontal projection modules include:
a laser emitting diode to emit a laser beam directly incident on a collimator, the collimator comprising a single lens,
the collimator configured to collimate the laser beam into a collimated beam and project the collimated beam on a planar reflective surface;
a planar reflective surface orientated at an angle of approximately 45° to a path of the collimated beam projected from the collimator and configured to divert the path of the collimated beam approximately 90° and toward a partial-conical reflective surface;
a partial-conical reflective surface formed from approximately 180° of an exterior surface of a cone and configured to reflect the diverted collimated beam into an approximately 180° fanned output beam;
where the vertical projection module generates a substantially vertical output beam and the horizontal projection module generates a substantially horizontal output beam, the vertical and horizontal output beams being projected from the housing in different but generally perpendicularly related directions, whereby the output beams can be used to indicate level, plumb and square alignment; and
a damper to dampen pendular motion of the projection unit;
where the vertical projection module is mounted relative the housing at an angle γ relative to a vertical axis of the housing and where the approximately 180° fanned output beam from the vertical projection module is rotated approximately the angle γ from a vertical orientation.

13. The apparatus of claim 12, where the angle γ is approximately 15°.

14. An apparatus for projecting an indication of alignment, comprising:
a housing, wherein the housing is dimensioned such that the apparatus can fit within the palm of a human hand;
a projection unit pendulously suspended in the housing to project output beams to indicate level, plumb and square where the projection unit includes a vertical projection module and a horizontal projection module and where each of the vertical and horizontal projection modules include:
a laser emitting diode to emit a laser beam directly incident on a collimator, the collimator comprising a single lens,
the collimator configured to collimate the laser beam into a collimated beam and project the collimated beam on a planar reflective surface;
a planar reflective surface orientated at an angle of approximately 45° to a path of the collimated beam projected from the collimator and configured to divert the path of the collimated beam approximately 90° and toward a partial-conical reflective surface;
a partial-conical reflective surface formed from approximately 180° of an exterior surface of a cone and configured to reflect the diverted collimated beam into an approximately 180° fanned output beam;
where the vertical projection module generates a substantially vertical output beam and the horizontal projection module generates a substantially horizontal output beam, the vertical and horizontal output beams being projected from the housing in different but generally perpendicularly related directions, whereby the output beams can be used to indicate level, plumb and square alignment; and a damper to dampen pendular motion of the projection unit;

where the laser emitting diode included in the vertical projection module is orientated such that the laser beam emitting therefrom has a substantially elliptical cross-section with a long axis of the ellipse orientated at an angle $\gamma$ relative to a vertical orientation such that the approximately 180° fanned output beam is rotated approximately the angle $\gamma$ from a vertical orientation.

15. A method for projecting an indication of alignment, the method comprising:

projecting a first laser beam from a first laser diode and a second laser beam from a second laser diode, where the first and second laser beams are projected directly onto a collimator comprising a single lens;

collimating the first laser beam into a first collimated beam and collimating the second laser beam into a second collimated beam, where:

the first collimated beam is incident on a first planar reflective surface and diverted approximately 90° toward an approximately 180° first conical reflective surface formed from at least approximately 180° of an exterior surface of a first cone, where a center of the first collimated beam is incident on a front face of the first conical reflective surface and not an apex of the first cone and the first collimated beam is reflected to form a first output beam fanning approximately 180° in a first direction; and the second collimated beam is incident on a second planar reflective surface and diverted approximately 90° toward an approximately 180° second conical reflective surface formed from at least approximately 180° of an exterior surface of a second cone, where a center of the second collimated beam is incident on a front face of the second conical reflective surface and not an apex of the second cone and the second collimated beam is reflected to form a second output beam fanning approximately 180° in a second direction;

where the first output beam indicates level, the second output beam indicates plumb, and the first and second output beams together indicate square.

16. The method of claim 15, further comprising:

providing an error indicator to indicate an error in the accuracy of the first and second output beams as indicators of level and plumb respectively; and deactivating the error indicator, such that the first and second output beams can be used at least to indicate square.

17. The method of claim 15, wherein the output beams are projected in the image of substantially straight lines.

18. An apparatus for projecting an indication of alignment, comprising:

a housing, the housing dimensioned such that the apparatus can fit within the palm of a human hand;

a projection unit pendulously suspended in the housing to project at least one output beam, the projection unit including at least one projection module where the at least one projection module includes:

a laser emitting diode to emit a laser beam directly incident on a collimator comprising a single lens, the collimator configured to collimate the laser beam into a collimated beam and project the collimated beam on a planar reflective surface;

a planar reflective surface orientated at an angle of approximately 45° to a path of the collimated beam projected from the collimator and configured to divert the path of the collimated beam approximately 90° and toward a partial-conical reflective surface;

a conical reflective surface formed from at least approximately 180° of an exterior surface of a cone and configured to reflect the diverted collimated beam into an approximately 180° fanned output beam, where the conical reflective surface is positioned relative to the planar reflective surface such that a center of the collimated beam is incident on a front face of the cone and is not incident on the apex of the cone; and a damper to dampen pendular motion of the projection unit.

19. The apparatus of claim 18, where:

the laser emitting diode emits a laser beam having a substantially elliptical cross-section; and the collimator is an aspheric lens.

20. A laser projection module comprising:

a laser emitting diode to emit a laser beam directly incident on a collimator comprising a single lens, the collimator configured to collimate the laser beam into a collimated beam and project the collimated beam on a planar reflective surface;

a planar reflective surface orientated at an angle of approximately 45° to a path of the collimated beam projected from the collimator and configured to divert the path of the collimated beam approximately 90° and toward a partial-conical reflective surface; and a partial-conical reflective surface formed from at least approximately 180° of an exterior surface of a cone and configured to reflect the diverted collimated beam into an approximately 180° fanned output beam, where the conical reflective surface is positioned relative to the planar reflective surface such that a center of the collimated beam is incident on a front face of the cone and is not incident on the apex of the cone.

21. The laser projection module of claim 20, where the laser emitting diode emits a laser beam having a substantially elliptical cross-section.

22. The laser projection module of claim 20, where the collimator is an aspheric lens.

23. The laser projection module of claim 20, where the planar reflective surface is a plane mirror.

* * * * *